United States Patent [19]
Bucciarelli

[11] Patent Number: 5,347,985
[45] Date of Patent: Sep. 20, 1994

[54] CONSTANT TEMPERATURE SOLAR WATER HEATER SWITCH

[76] Inventor: Douglas A. Bucciarelli, 515 Leffingwell #210, Ellenton, Fla. 34222

[21] Appl. No.: 25,620

[22] Filed: Mar. 3, 1993

[51] Int. Cl.$^5$ ................................. F24J 2/40
[52] U.S. Cl. ...................... 126/572; 136/248
[58] Field of Search ............. 136/248; 126/572, 646

[56] References Cited

U.S. PATENT DOCUMENTS

| | | | |
|---|---|---|---|
| 2,325,094 | 7/1943 | Ashworth | 236/46 |
| 2,571,822 | 10/1951 | Bohn | 236/46 |
| 4,147,157 | 4/1979 | Zakhariya | 136/248 |
| 4,409,961 | 10/1983 | O'Hare | 126/646 |
| 4,483,319 | 11/1984 | Dinh | 126/646 |
| 4,921,580 | 5/1990 | Martes et al. | 126/646 |

FOREIGN PATENT DOCUMENTS 164952 9/1983 Japan ..................... 126/572

*Primary Examiner*—Carroll B. Dority

[57] ABSTRACT

A constant temperature solar water heater switch, for operating a solar water heating element, using an electrical motor, and a water pump, the water pump pumping water from a water source to the solar water heating element, which uses the solar rays to heat the water, and then returning the water to the source. This system matches a solar PV panel to a compatible relay, using a variable resistance to adjust for desired operation of the system, in order to shut the system down when the sun is not shining directly, and sufficiently to heat the water in the solar heater element, in order to prevent cool water to re-enter the source.

A manual electrical overide switch is provided for manual operation of the system, for manual operation, or, for preventative maintenance.

3 Claims, 1 Drawing Sheet

CONSTANT TEMPERATURE SOLAR WATER HEATER SWITCH

BACKGROUND OF INVENTION

This invention relates to an apparatus and method of using solar energy to control the flow of water in a water heater, and to cause the flow to stop when the solar energy is temporarily disrupted, by clouds, or other disruptions, thereby aiding in keeping the water source at a constant temperature.

It has been customary to use the sun as the heating element for a body of water. The water is pumped through a series lengths of thin walled tubing, the tubing being painted black, to absorb more of the solar rays into the water, and thereby increasing the efficiency of the solar heating system. The inventor has found these systems to be deficient in many cases, when the sun is blocked by clouds, causing the pumped water to be cooled in the heating element, rather than being heated by the solar rays, during the pumping cycle.

In several adaptations of these solar water heating systems, it is necessary that the water be maintained at a certain temperature, or, it disrupts the equipment it is supposed to heat.

Several approaches have been provided for heating the water, using solar energy. Shultz, in U.S. Pat. No. 4,543,944 teaches a complicated solar heating system, for controlling the operation of a fan, or, a pump. However, Schultz teaches a system which has a unique system to keep the system from turning off the pump, or the fan, when the solar rays are disrupted during shady periods, and therefore, would not be conducive to maintaining a constant temperature of the output of the water, or, the fan.

Another approach is taught by Crowe, in U.S. Pat. No. 5,003,441, wherein an outside lighting system is controlled by the solar rays reacting on a solar panel, or, PV panel. Here again, the teaching of Crowe is deficient in maintaining a constant lighting system, as the appearance of clouds during the daytime would turn on the lighting system. This inadvertent turning on of the system is not acceptable in many applications.

Still another approach is taught in the art of Stone, in U.S. Pat. No. 4,516,565, wherein a container of special fluid is used to detect the solar rays, causing a water pump to be activated, thereby pumping water through a solar collector, and heating the water in a pool. The problem with this approach is the same as most of the teachings in the prior arts, in this field, in that the sensitivity of the system is not present to the degree that a constant temperature can be attained in the water.

SUMMARY OF THE INVENTION

Accordingly, it is an object of this invention to provide solar switch, which is tuned to the requirements of a relay system, and the relay system being chosen to provide the required sensitivity to be non-operable during cloudy periods, when there is not enough solar rays to heat the water in the solar heating system, and this turning off the system during these cloudy, non-heating periods thereby aiding in the maintaining of a constant temperature of the water.

Another object of this invention is to provide the capability of choosing a relay of a power requirement to be only operated during periods of sunshine, and to be non-operable during shady periods.

Another object of this invention is to provide this solar water heating switch with a variable resistance, which can be adjusted to further control the sensitivity of the relay, further allowing the relay to be inoperable during periods unwanted operation of the solar water heating system.

Still another object of this invention is to provide this solar switch with the capability of utilizing any size solar PV (Photo-voltaic) panel, and associated relay system, in order to provide capability of operating any load, or any size load.

Yet another object of this invention is to provide this solar water heater switch with manual, or automatic override capability, to operate the load by using this override switch, as desired, and for checking the system operation.

In carrying out this invention in the illustrative embodiment thereof, a solar panel is chosen for the load to be switched, and is connected to the coil windings of a compatible relay. Now, when the sun is shining as desired, the solar PV panel generates the required amount of V/A potential to operate the relay. As the relay is operated, several relay contacts are closed, providing closed contact paths for any desired load. In this embodiment, the load is an electric motor, and the electric motor driving a water pump, and the water pump pumping a desired supply of water through a solar water heating system.

The solar PV panel generates a potential to operate the relay, the relay being of a size as to be compatible with the output of the PV panel. However, in those cases where a relay is not exactly compatible with the output of the solar PV panel, a variable resistance resistor is provided, and connected in the path from the solar PV panel to the coil of the relay, to further provide compatibility with the V/A requirements of the relay.

Now, when the relay is operated, an AC potential is connected through two of the sets of contacts of the relay to a motor, thereby activating the motor. A water pump, or other load, is connected to the motor, which has a water input from the water source, and also has an output to a solar heating element. As the water is pumped through the solar heating element, it is heated by the solar rays of the sun, and the heated water is then discharged from the solar heating element, back into the water source.

Now, and this is a particular point of this embodiment, if the sun should be obliterated by clouds, or other sources of obliteration, the solar PV panel no longer has an output to the relay, and the relay opens the contacts, thereby disconnecting the AC potential to the motor, causing the motor to stop, and, when the motor stops, the pump stops, thereby leaving the water in the solar heating element. As the water does not leave the solar heating element, and re-enter the water source, without being heated, cool water is not pumped back into the water source, thereby aiding in keeping the water source temperature at a constant temperature. In this way, only warm water will be discharged from the solar heating element, providing this more constant temperature in the solar heating element.

In some cases, when it is desired to operate the system, when the solar rays are not present, or, when it is desired to operate the water system at night, a manual overide switch is provided. The overide switch can be positioned manually to connect the AC potential directly to the motor, by-passing the relay, and thereby activating the pump, and pumping the water through the system as desired.

Re-positioning the manual switch turns the motor off as desired.

Conveniently, the user may use the PV panel to operate the system, or, can operate the system manually by using the overide switch.

BRIEF DESCRIPTION OF THE DRAWINGS

This invention, together with other objects, features, aspects and advantages thereof, will be more clearly understood from the following description, considered in conjunction with the accompanying drawings.

One sheet of drawings are furnished, containing FIGS. 1, and 2.

DESCRIPTION OF THE PREFERRED EMBODIMENTS

Figure 1:
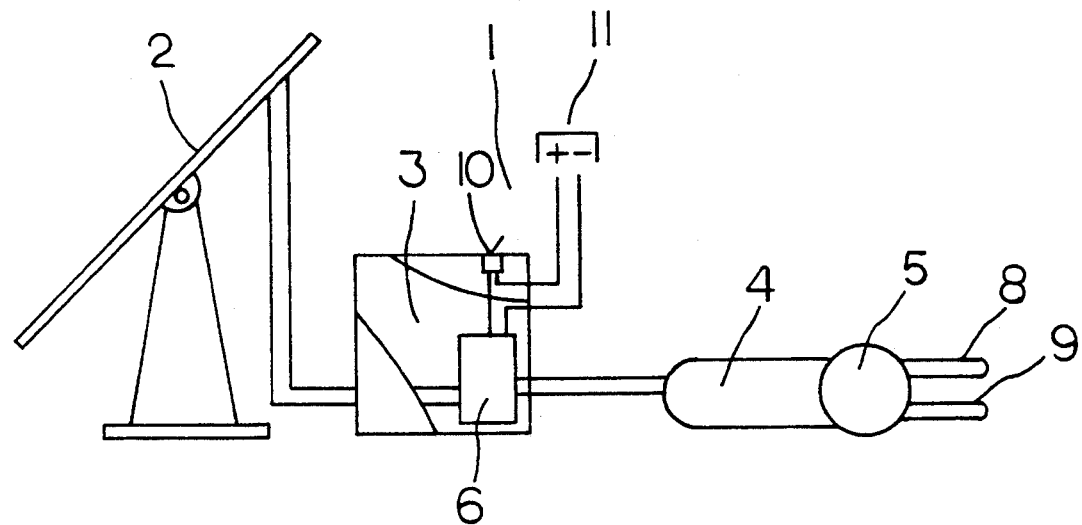
FIG. 1 is a block flow diagram of the solar switching system.

Referring now to FIG. 1, a Solar water heater switch, referred to generally by the reference numeral 1 is made of a suitable material, and is of a size to fit the requirements of the system when the sun is shining directly. A solar PV panel 2 is connected to the coil of relay 6 through a variable resistor 12, said resistor 12 compensating for different size relays. When solar PV panel 2 is activated by the solar rays, relay 6 operates, thereby closing several sets of contacts. However, when the solar rays are disrupted by clouds, or other obstacles, solar PV panel 2 has no output, or, a restricted output, and relay 6 falls off, disconnecting all potential to motor 6, thereby stopping the operation of pump 5, thereby preventing the pumping of cool water into the water source.

Figure 2:
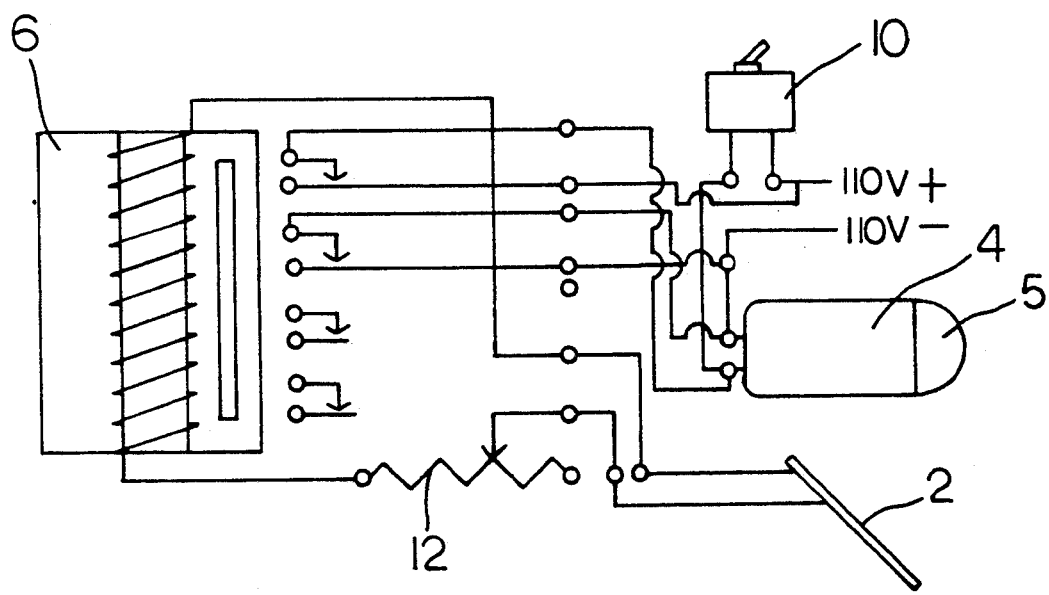
FIG. 2 is a more detailed block flow diagram of the relay, the relay contacts, the overide switch, the motor, and the pump, as well as the solar PV panel.

Now, as seen in FIG. 2, a potential of 110 volts AC 11, is connected to two sets of contacts of relay 6, the positive lead traversing one set of contacts, and connecting to the positive contact of motor 4. The negative lead of the 110 V AC connecting through another set of contacts of relay 6, and then connecting to the negative lead of motor 4, thereby completing a circuit through motor 4, and motor 4 operating a pump 5, and pump 5 having input 8, and output 9, thereby pumping water from a water source to a solar water heating element, not shown. Relay 6, resistor 12, and switch 10 being enclosed in box 3, box 3 shown in FIG. 1.

Now, and still referring to FIG. 2, we see a manual switch 10, and manual switch 10 having capability to break, or make, the positive lead of the 110 v AC potential 11. When switch 10 is activated correctly, 110 V AC is connected to motor 6, and the circuit is completed, and motor 6 again activates pump 5, thereby pumping water through the solar heating element under manual control.

Accordingly, a very unique, attractive, convenient method and apparatus are provided for utilizing solar rays to automatically activate a motor and pump to pump water through a solar water heating element, when the sun is shining, and to stop the operation of the motor and pump when the sun is not shining sufficiently to heat the water in a solar heating element, and thereby aiding in providing a constant temperature in the water source.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A constant temperature solar water heater switch control apparatus, for using the solar rays of the sun to control a relay, said relay directing 110 V commercial power to a motor-pump apparatus, and said motor-pump apparatus pumping water through a solar PV water heating system, said water to be solar heated, and pumped through a using apparatus, comprising:
   a substantially square box type enclosure, said enclosure having at least one side open,
   a substantially square cover, said cover removeably covering the open side of said enclosure,
   a solar PV panel
   a relay, said relay having sufficient contacts to switch 110 V commercial power to a motor-pump apparatus,
   a variable resistor, said resistor having capability to compensate for various 110V load requirements of said relay,
   a manual over-ride test switch, said over-ride switch to provide commercial power to said motor-pump apparatus for maintenance use.

2. A solar water heater control system comprising; an electrical relay switch, a solar PV panel electrically connected in a first circuit to said relay switch to close said switch when sufficient sun is present, a variable resistor in said circuit, an auxiliary power supply, a second electrical circuit connected to said relay switch and to a pump, said relay switch including means for electrically connecting said pump to said auxiliary power source when said solar PV panel provides sufficient energy to activate said relay, a solar water heating system, said pump being located in said solar water heating system for pumping water through said solar water heating system.

3. A solar water heater control system comprising:
   an electrical relay switch,
   a solar PV panel, electrically connected in a first circuit to said relay switch to close said switch when sufficient sun is present,
   a variable resistor in said first circuit,
   an auxiliary power supply,
   a second electrical circuit connected to said relay switch, and to a pump,
   switch means in said second circuit for manually connecting said pump to said auxiliary power source, said relay switch including means for electrically connecting said pump to said auxiliary power source, when said solar PV panel provides sufficient energy to activate said relay,
   a solar water heating system, said pump being located in said solar water heating system for pumping water through said solar water heating system.

* * * * *